United States Patent
Min et al.

(10) Patent No.: US 9,661,203 B2
(45) Date of Patent: May 23, 2017

(54) LENS DRIVING DEVICE AND CAMERA MODULE HAVING A PREVENTING STRUCTURE FOR AN INROAD OF FOREIGN OBJECTS

(71) Applicant: LG INNOTEK CO., LTD., Seoul (KR)

(72) Inventors: Sang Jun Min, Seoul (KR); Hyune O Yoo, Seoul (KR); Sung Guk Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/533,348

(22) Filed: Nov. 5, 2014

(65) Prior Publication Data

US 2015/0124160 A1    May 7, 2015

(30) Foreign Application Priority Data

Nov. 5, 2013   (KR) ................ 10-2013-0133346

(51) Int. Cl.
   *H04N 5/335*    (2011.01)
   *H04N 5/225*    (2006.01)
(52) U.S. Cl.
   CPC ............................... *H04N 5/2257* (2013.01)
(58) Field of Classification Search
   CPC .................................................. H04N 5/2257
   USPC ........................................................ 348/374
   See application file for complete search history.

(56) References Cited

U.S. PATENT DOCUMENTS

| | | | |
|---|---|---|---|
| 2008/0131112 A1* | 6/2008 | Aoki ...................... | G03B 17/48 396/429 |
| 2009/0033789 A1* | 2/2009 | Lin .......................... | G02B 7/02 348/374 |
| 2010/0246035 A1* | 9/2010 | Yamashita .......... | H02K 41/0356 359/824 |
| 2014/0072289 A1* | 3/2014 | Lim ....................... | G03B 13/36 396/55 |

\* cited by examiner

*Primary Examiner* — Usman Khan
(74) *Attorney, Agent, or Firm* — Ked & Associates, LLP

(57) ABSTRACT

A camera module includes a PCB (Printed Circuit Board) mounted with an image sensor, and a holder member arranged at an upper surface of the PCB and mounted with a plurality of magnets. The camera module also includes a bobbin movably mounted from an inner side of the holder member to a direction of an optical axis and installed at a periphery with a coil unit to enable an electromagnetic interaction with the magnets, and a lug protrusively formed from a floor surface of bobbin to a direction of external diameter of bobbin to overlap with the floor surface of the holder member for a predetermined section.

22 Claims, 4 Drawing Sheets

LENS DRIVING DEVICE AND CAMERA MODULE HAVING A PREVENTING STRUCTURE FOR AN INROAD OF FOREIGN OBJECTS

CROSS-REFERENCE TO RELATED APPLICATION

This application claims priority under 35 U.S.C. §119 to Korean Application No. 10-2013-0133346, filed on Nov. 5, 2013, whose entire disclosure is incorporated herein by reference.

BACKGROUND

1. Field

The teachings in accordance with the exemplary embodiments of this present disclosure generally relate to a camera module.

2. Background

Generally, a camera module may include an optical system formed with an image sensor, a PCB (Printed Circuit Board) mounted with the image sensor configured to transmit an electric signal, an IR (Infrared) cut-off filter configured to cut off light of infrared region and at least one sheet of lens configured to transmit an image to the image sensor. At this time, the optical system may be installed with an actuator module configured to perform an auto focusing function and a hand shake correction function.

The camera module may be penetrated by inner foreign objects generated by movement of actuator module and outer pollutant objects such as dusts generated in the course of assembly process. These foreign objects generally drop at an upper surface of the IR cut-off filter to cause a poor image, and various measures are being waged to prevent the intrusion of foreign objects. However, it is difficult to prevent the inroad of foreign objects due to structural configuration of camera module, and it is not possible to prevent the inner foreign objects generated in the course of performing an auto focusing function from moving towards the IR cut-off filter.

BRIEF DESCRIPTION OF THE DRAWINGS

The embodiments will be described in detail with reference to the following drawings in which like reference numerals refer to like elements wherein.

DETAILED DESCRIPTION

Figure 1:
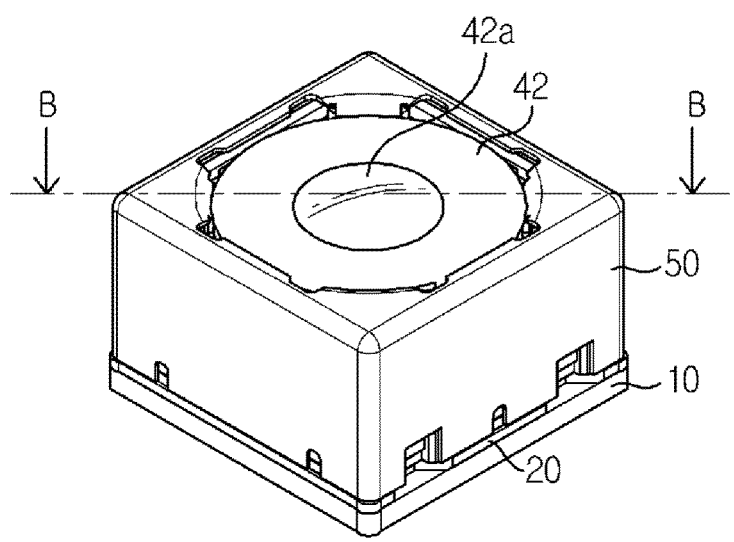
FIG. 1 is a perspective view illustrating an example of a camera module according to an exemplary embodiment of the present invention.
Figure 2:
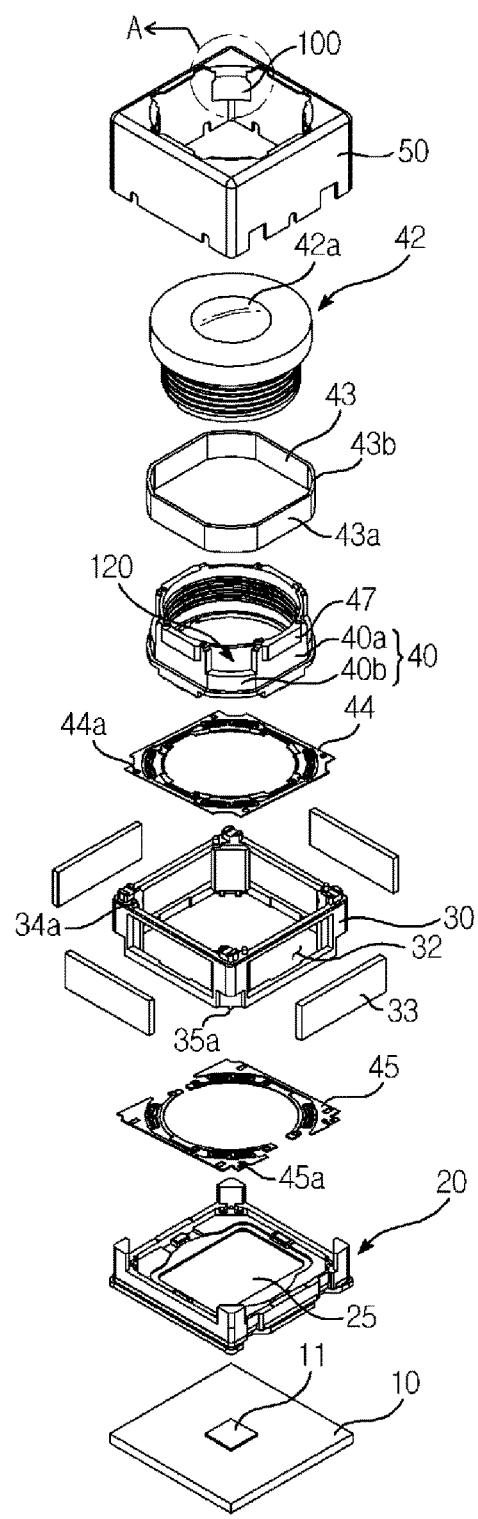
FIG. 2 is an exploded perspective view of FIG. 1.
Figure 3:
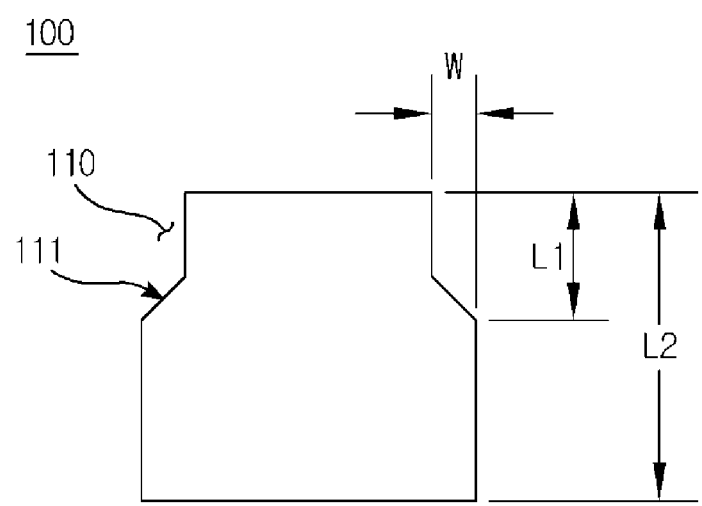
FIG. 3 is an enlarged view of 'A' part of FIG. 2.
Figure 4:
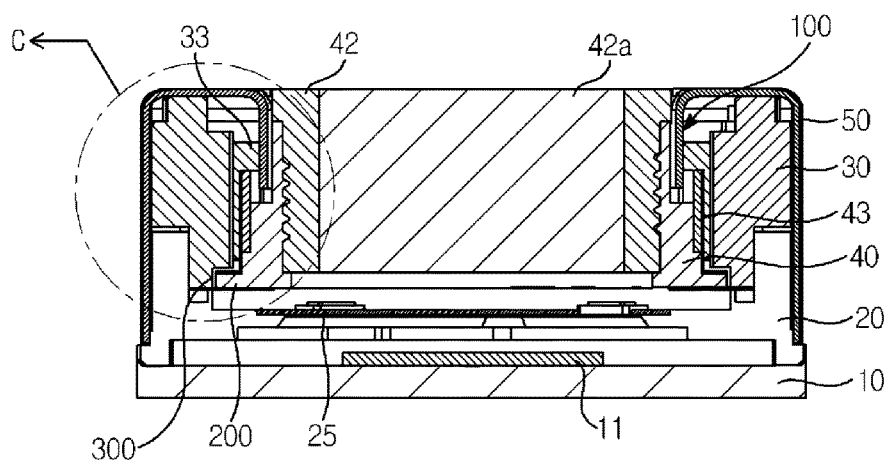
FIG. 4 is a cross-sectional view taken along line 'B-B' of FIG. 1.
Figure 5:
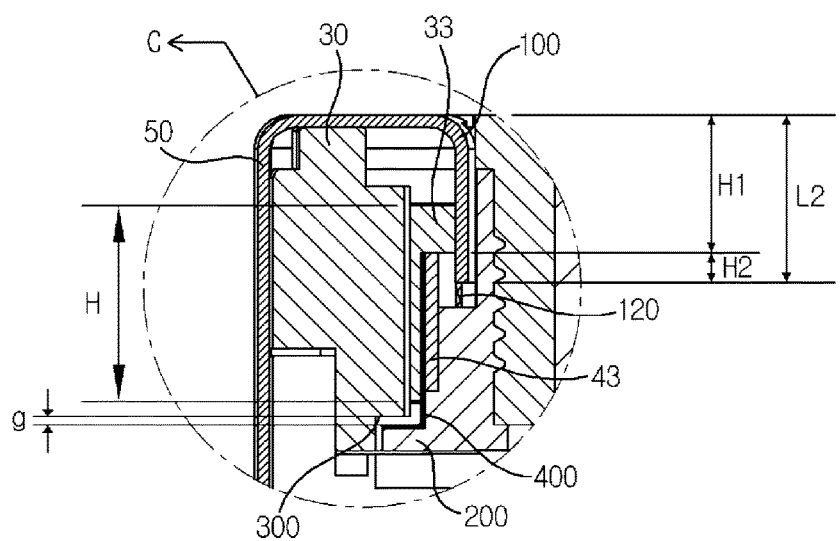
FIG. 5 is an enlarged view of 'C' part of FIG. 4.

FIG. 1 is a perspective view illustrating an example of a camera module according to an exemplary embodiment of the present disclosure, FIG. 2 is an exploded perspective view of FIG. 1, FIG. 3 is an enlarged view of 'A' part of FIG. 2, FIG. 4 is a cross-sectional view taken along line 'B-B' of FIG. 1, and FIG. 5 is an enlarged view of 'C' part of FIG. 4. The camera module may include a PCB (Printed Circuit Board, 10), a base (20), a holder or a holder member (30), a bobbin (40) and a cover or a cover member (50).

The PCB (10) may be mounted with an image sensor (11) to form a floor surface of the camera module. The base (20) may include an IR (Infrared) cut-off filter at a position corresponding to that of the image sensor (11) and may support a floor surface of the holder member (30). The base (20) may be installed with an IR cut-off filter (25) at a position corresponding to that of the image sensor (11) to support a floor surface of the holder member (30). The base (20) may be installed with a separate terminal member for conductivity with the PCB (10), and may be integrally formed with a terminal using a surface electrode. As can be appreciated, the base (20) is not necessary if the holder member (30) is modified to perform the function of a base.

The holder member (30) may take a hollow square pillar shape, and may be formed with four (4) magnet mounting openings or holes (32), each hole being inserted by a same-sized magnet (33). The magnets (33) may be formed with a mutually corresponding size and each facing magnet (33) may be arranged in parallel.

Referring to FIG. 2, the holder member (30) may take a hexahedron shape with four sides being provided with thin frame shapes, and upper and bottom surfaces of the holder member (30) may be mounted with elastic members (44, 45) to elastically support the reciprocal movement of bobbin (40) to an axial direction, which is perpendicular to a surface of image sensor (11).

A floor surface of the holder member (30) may be coupled to the base (20) and an upper surface of holder member (30) may be coupled to the cover member (50) for position fixation. The upper elastic spring or member (44) may be interposed or held between the holder member (30) and the cover member (50) and the bottom elastic spring or member (45) may be interposed or held between the holder member (30) and the base (20).

The bobbin (40) may be so installed at an inner space of the holder member (30) as to reciprocally move to a direction parallel with an optical axis. The bobbin (40) may be mounted at a periphery with a coil unit (43) to perform an electromagnetic interaction with the magnet (33). The bobbin (40) may include a lens barrel (42) installed with at least one lens (42a) where the lens barrel (42) may be screwed into an inner surface of the bobbin (40) as illustrated in FIG. 2.

Although not illustrated in FIG. 2, the lens barrel (42) may be directly fixed to the bobbin (40) without recourse to the screwing method to the inner side of the bobbin (40). Alternatively, at least one sheet of lens (42a) may be integrally formed with the bobbin (40) without the lens barrel (42). The lens (42a) may be formed with one sheet or layer, or two or more sheets or layers of lenses may form an optical system.

The bobbin (40) may be installed with upper and bottom elastic members (44, 45) each formed at an upper surface and a bottom surface of the bobbin (40), where one end of the upper and bottom elastic members (44, 45) may be connected to the holder member (30) and the other end may be connected to the bobbin (40). For example, as illustrated in FIG. 2, first and second lugs (34a, 35a) may be formed at upper and bottom sides of the holder member (30) for coupling with respective elastic members, and first and second reception holes (44a, 45a) may be formed at positions corresponding to those of the upper and bottom elastic members (44, 45), whereby the upper and bottom elastic members (44, 45) are fixed to the holder member (30).

The upper and bottom members (44, 45) may be also coupled to upper and bottom surfaces of the bobbin (40) in the same manner as above. By this configuration, the bobbin

(40) may be elastically supported by the upper and bottom elastic members (44, 45) about the fixed position of the holder member (30) when the bobbin (40) reciprocates axially.

The coil or coil unit (43) may be provided in a ring-shaped or octagon-shaped angled coil block insertedly coupled to a periphery of the bobbin (40). The coil unit (43) formed in the shape of coil block may include a straight line surface (43a) arranged at a position corresponding to that of the magnet (33), and a curved line surface (43b) arranged at a position corresponding to that of an inner yoke (100) and a reception groove (120), and may include a straight line surface altogether.

The bobbin (40) may include a first surface (40a) flatly formed on a surface corresponding to that of the straight line surface (43a), and a second surface (40b) roundly formed at a surface corresponding to that of the curved line surface (43b) to allow the coil unit (43) to be coupled to a periphery of the coil unit (43). The first surface (40a) may be formed with a lug (47) to prevent disengagement to an axial direction of the coil unit (43), whereby the coil unit (43) can be prevented from being disengaged from an installed position by shocks generated in the course of reciprocal movement of the bobbin (40).

The bobbin (40) may include a plurality of reception grooves (120) formed at a circumferential surface of the bobbin to create a space by being distanced from the coil unit (43) at a predetermined gap. The plurality of reception grooves (120) may be inserted by a plurality of inner yokes (100) formed by bending a yoke functioning as a housing without an inner yoke (100) formed at the cover member (50) or a separate cover member. The relationship between the inner yokes (100) and the reception grooves (120) will be described later.

The cover member (50) may be formed with a ferromagnetic substance like steel, metal, e.g., and may be provided in a shape corresponding to that of the holder member (30) to wrap a whole shape of holder member (30). As illustrated in FIGS. 1 to 4, when the holder member (30) takes a square pillar shape, the cover member (50) may be also provided in a square pillar shape.

The cover member (50) may be integrally formed at a position corresponding to that of the reception groove (120) with the inner yoke (100). According to an exemplary embodiment of the present disclosure, one surface of the plurality of inner yokes may be distanced from the coil unit (43) at a predetermined gap, the other side of plurality of inner yokes may be distanced from the bobbin (40) at a predetermined gap. Furthermore, the inner yokes (100) and the reception grooves (120) may be respectively formed at four corners of the cover member (50) and the holder member (30). When the magnet (33) is arranged at each corner (four corners) of the holder member (50), the inner yoke (100) may be arranged at a corresponding position to concentrate the electromagnetic force or magnetic flux of the magnet (33) and the coil unit (43).

Referring to FIGS. 2 and 3, the inner yoke (100) may be downwardly in a round shape along a direction parallel with the optical axis from an upper surface of the cover member (50), and may be formed with a pair of relief recess or escape grooves (110) symmetrically formed at a position near to that of the bent portion of the inner yoke (100). The bent portion formed with the escape or relief grooves (110) are formed at a bottleneck section to minimize interference by the inner yoke (100) and the bobbin (40) when the bobbin (40) moves.

Each of the pair of escape grooves (110) may have a length (L1) shorter than an entire length (L2) viewed from a front surface, i.e., when viewed from an optical axis line of the inner yoke by 20 to 50%, as illustrated in FIG. 3, and may include a slanted surface having a predetermined angle relative to an optical axis. The inner yoke (100) may have a width gradually increasing toward a distal end due to formation of the slanted surface, where a width of distal end of the inner yoke (100) may be equal to or narrower than that of the reception groove (120).

Referring to FIG. 3, the escape groove (110) may have a cut-off surface (w) of 0.1 to 0.5 mm width relative to a width direction of the inner yoke (100), where the given numerical values may vary depending on increase or decrease of size of the camera module.

Referring to FIGS. 4 and 5, an entire length (L2) of the inner yoke (100) viewed from a front surface of the inner yoke (100) may be greater than a length (H1) from an upper surface of the cover member (30) to an upper surface of the coil unit (43). When the inner yoke (100) is inserted into the reception groove (120), the inner yoke (100) may overlap at a predetermined length (H2) of the coil unit (43) in a space formed between the coil unit (43) and the bobbin (40).

An entire length (L2) of the inner yoke (100) viewed from a front surface of the inner yoke may be 20% to 40% an entire length (H) of the magnet (33). When the entire length (L2) of the inner yoke (100) deviates the given numerical scope to excessively shorten the inner yoke (100), the electromagnetic effect may deteriorate to generate interference with an upper end of the coil unit (43) during the driving and to allow foreign objects into a gap. When the length of the inner yoke is excessively long, the electromagnetic effect may also deteriorate, and it is difficult to manufacture a camera module due to difficulty in management of perpendicularity and concentricity.

A length (H2) overlapped with the coil unit (43) by a distal end of the inner yoke (100) being inserted into the reception groove (120) may be formed longer than a back stroke distance of the bobbin (40), where an upper distal end of the coil unit (43) may be arranged at a side higher than a distal end of the inner yoke (100) from a lowest position when the bobbin (40) reciprocates.

The distal end of the inner yoke (100) needs to be spaced apart from the floor surface of the reception groove (120) at a predetermined distance, which is to prevent interference and contact between the floor surface of the reception groove (120) and the distal end of the inner yoke (100) from a highest position when the bobbin (40) reciprocates.

Meanwhile, as illustrated in FIGS. 4 and 5, a flange or lug (200) may be formed at a position near to the floor surface of the bobbin (40) to maximally prevent the inroad of foreign objects. The lug (200) may be protrusively formed from the floor surface of the bobbin (40) toward a direction of external diameter of the bobbin (40). The lug (200) may be formed across an entire periphery of the bobbin (40), or may be formed only at four-cornered areas formed by the inner yoke (100). The lug (200) may be overlapped with the floor surface of the holder member (30) at a predetermined portion to increase or to complicate the length of transit path of the foreign objects that are introduced into a gap between the holder member (30) and the bobbin (40).

A convex groove (300) may be formed at a position corresponding to that of the lug (200) of the holder member (30), where the convex groove (300) may be spaced apart from the lug (200) at a predetermined distance (g) toward an optical axis direction to prevent the interference with the bobbin (40) when the bobbin (40) reciprocates. The distance (g) between the lug (200) and the convex groove (300) may be greater than a moving stroke of the bobbin (40) to thereby prevent contact between a surface of the lug (200) and a surface opposite to the convex groove (300) when the bobbin (40) reciprocates. The lug (200) may be prevented from colliding with a surface opposite to the convex groove (300) when the bobbin (40) vertically moves relative to an optical axis in order to perform the auto focusing function.

According to an exemplary embodiment of the present disclosure, a dust trap may be coated on a periphery of the coil unit (43) and an upper surface of the lug (200) in order to minimize inroad of foreign objects into an IR cut-off filter (25) generated from outside. The dust trap (400) may be formed with adhesive member such as epoxy and the like.

As noted from the foregoing, the reception groove (120) may provide a structure of initially collecting the foreign objects riding down the inner yoke (100) to minimize the inroad of the foreign objects into the camera module when the inner yoke (100) integrally formed with the cover member (50) is arranged at an inner side of a space formed by the reception groove (120) formed at a periphery of the bobbin (40). The dust trap (400) is coated on the periphery of the coil unit (43) and the upper surface of the lug (200), as illustrated in FIGS. 4 and 5.

The moving path of foreign objects may be complicated in terms of configuration when the external diameter of the bobbin (40) is enlarged, whereby bad images of camera caused by foreign objects introduced through an upper portion of the actuator such as Voice Coil Motor, or by foreign objects generated that are generated thereinside, may be prevented from being generated.

The electromagnetic efficiency may be maximized and interference of each elements that is generated in the course of vertical movement of bobbin (40) can be minimized, because the entire length (L2) of the inner yoke (100) is 20 to 40% the entire length (H) of the magnet (33), and the entire length (L2) of the inner yoke (100) is greater than the distance (H1) from the upper surface of the cover member (30) to the upper surface of the coil unit (43), The bobbin (40) may prevent from rotating relative to an optical axis direction by external shocks or erroneous operation, because both wing portions of the inner yoke (100) may be restricted inside a space formed by an inner circumferential surface of the reception groove (120) and a surface opposite to the bobbin (40) of the coil unit (43).

A camera module of the present disclosure is configured to improve electromagnetic properties and to prevent inroad of foreign objects.

A camera module of the present disclosure comprises a PCB (Printed Circuit Board) mounted with an image sensor; a holder member arranged on the PCB and equipped with a plurality of magnets; a bobbin movably mounted inside the holder member to a direction of an optical axis and installed at a periphery with a coil unit to enable an electromagnetic interaction with the magnets; and a lug protrusively formed from a floor surface of bobbin to a direction of external diameter of bobbin to overlap with a floor surface of the holder member for a predetermined section.

The holder member may be formed with a convex groove at a position corresponding to that of the lug.

A discrete distance (g) along to the optical axis between the lug and the convex groove may be greater than a moving stroke of the bobbin.

A dust trap may be formed between a periphery of the coil unit and an upper surface of the lug.

The camera module may further include a plurality of reception grooves formed at a circumferential surface of the bobbin to create a space by being distanced from the coil unit at a predetermined gap; and a cover member arranged at a position corresponding to that of the plurality of reception grooves and integrally formed with a plurality of inner yokes, one side of which is distanced from the coil unit at a predetermined gap, the other side of which is distanced from the bobbin at a predetermined gap.

The inner yokes and reception grooves may be respectively formed at four corners of cover members and holder members.

The inner yoke may be downwardly bent in a round shape along a direction parallel with the optical axis from an upper surface of the cover member, and the inner yoke is formed with a pair of escape grooves symmetrically formed at a position near to that of the bent portion of the inner yoke.

Each of the pair of escape grooves may have a length (L1) shorter than an entire length (L2) viewed from a front surface of the inner yoke by 20 to 50%.

The escape groove may include a slanted surface having a predetermined angle.

The entire length (L2) viewed from a front surface of the inner yoke may be greater than a length (H1) from an upper surface of the cover member to an upper surface of the coil unit.

The entire length (L2) viewed from a front surface of the inner yoke may be 20 to 40% of an entire length (H) of the magnet.

A length (H2) overlapped with the coil unit by a distal end of the inner yoke being inserted into the reception groove may be formed longer than a back stroke distance of the bobbin, and an upper distal end of the coil unit may be arranged at a side higher than a lower distal end of the inner yoke at the lowest position of the bobbin during its reciprocation.

The holder member may include four magnet mounting holes, each hole being inserted by each of the plurality of magnets.

The cover member may be formed with a ferromagnetic substance.

The bobbin may include a lens barrel installed therein with at least one lens.

The camera module may further comprise upper and bottom elastic members respectively fixed to upper and bottom surfaces of the holder member to elastically support a vertical movement of the bobbin.

The coil unit may be a ring-shaped coil block insertedly coupled to a periphery of the bobbin.

The coil unit may include a straight line surface arranged at a position corresponding to that of the magnet, and a curved line surface arranged at a position corresponding to that of the inner yoke and the reception groove.

The bobbin may include a first surface flatly formed on a surface corresponding to that of the straight line surface, and a second surface roundly formed at a surface corresponding to that of the curved line surface.

The first surface may include a lug configured to prevent disengagement of the coil unit to a direction of the optical axis.

The camera module may further comprise a base interposed between the PCB and the holder member and installed with an IR cut-off filter.

A floor surface of the holder member may be fixedly coupled to the base, and an upper surface of the holder member is fixedly coupled to the cover member.

The camera module according to the exemplary embodiments of the present disclosure has an advantageous effect in that the camera module is formed with an inner yoke to increase the length of a foreign object inroad path whereby inroad of foreign objects can be minimized. Furthermore, a dust trap is coated on a surface of a coil unit mounted at a periphery of a bobbin and on an upper surface of a lug formed near to a floor surface of the bobbin to minimize inroad into an IR cut-off filter of foreign objects possibly generated in the course of reciprocating movement of bobbin.

Another advantageous effect is that an inner yoke is formed with an escape groove to minimize generation of interference from the inner yoke and the bobbin when the bobbin is trembled by external shock in the course of auto focusing operation.

Still another advantageous effect is that a distal end of the inner yoke is inserted into a groove formed at an inner space of the coil unit wound on a periphery of the bobbin to collect foreign objects generated by movement of bobbin or downwardly introduced into along the inner yoke.

Still another advantageous effect is that an entire length of the inner yoke is formed to be longer than an entire length of a magnet by at least 20% to enable a Voice Coil Motor unit to have optimal electromagnetic properties.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A camera module, the camera module comprising:
a Printed Circuit Board (PCB) mounted with an image sensor;
a holder member provided at an upper side of the PCB;
a bobbin provided at an inner side of the holder member, and configured to move in a direction of an optical axis;
a magnet provided on the holder member;
a coil provided on the bobbin and facing the magnet;
a plurality of reception grooves formed at an outer circumferential surface of the bobbin and creating a space between the bobbin and the coil;
a cover member covering the holder member; and
an inner yoke integrally formed with the cover member and provided at a position corresponding to a position of the plurality of reception grooves,
wherein a first side of the inner yoke is distanced from the coil and a second side of the inner yoke is distanced from the bobbin,
wherein the inner yoke includes a portion overlapped with the coil in a horizontal direction perpendicular to the optical axis at a lowest position of the bobbin when the camera module is driven.

2. The camera module of claim 1, wherein a lug is radially protruded from an outer lateral surface of the bobbin, and
wherein the holder member is formed with a groove at a position corresponding to a position of the lug.

3. The camera module of claim 2, wherein a distance along to the optical axis between the lug and the groove is greater than a moving stroke of the bobbin.

4. The camera module of claim 2, wherein a dust trap is formed between a periphery of the coil and an upper surface of the lug.

5. The camera module of claim 2, wherein at least a portion of the holder member overlaps at least a portion of the lug in the optical direction.

6. The camera module of claim 1, wherein the inner yoke and the plurality of reception grooves are respectively formed at four corners of the cover member and the holder member.

7. The camera module of claim 1, wherein the inner yoke is downwardly bent in a round shape along a direction parallel with the optical axis from an upper surface of the cover member, and the inner yoke is formed with a pair of recesses symmetrically formed at a position near to that of bent portion of the inner yoke.

8. The camera module of claim 7, wherein each of the pair of recesses has a length shorter than an entire length viewed from a front surface of the inner yoke by 20 to 50%.

9. The camera module of claim 7, wherein the recess includes a slanted surface having a predetermined angle.

10. The camera module of claim 1, wherein the an entire length viewed from a front surface of the inner yoke is greater than a length from an upper surface of the cover member to an upper surface of the coil.

11. The camera module of claim 1, wherein an entire length viewed from a front surface of the inner yoke is 20 to 40% of an entire length of the magnet.

12. The camera module of claim 1, wherein the holder member includes four magnet mounting openings, each opening being inserted with a corresponding magnet.

13. The camera module of claim 1, wherein the cover member is formed with a ferromagnetic substance.

14. The camera module of claim 1, wherein the bobbin includes a lens barrel installed therein with at least one lens.

15. The camera module of claim 1, further including upper and bottom elastic springs respectively fixed to upper and bottom surfaces of the holder member to elastically support a vertical movement of the bobbin.

16. The camera module of claim 1, wherein the coil is a ring-shaped coil block insertedly coupled to a periphery of the bobbin.

17. The camera module of claim 1, wherein the coil includes a straight line contour arranged at a position corresponding to a position of the magnet, and a curved contour arranged at a position corresponding to a position of the inner yoke and the reception groove.

18. The camera module of claim 17, wherein the bobbin includes a first surface flatly formed on a surface corresponding to a surface of the straight contour, and a second surface roundly formed at a surface corresponding to a surface of the curved contour.

19. The camera module of claim 18, wherein the first surface includes a lug configured to prevent disengagement of the coil in a direction of an optical axis.

20. The camera module of claim 1, further including a base interposed between the image sensor and the holder member and installed with an IR cut-off filter.

21. The camera module of claim 20, wherein a floor surface of the holder member is fixedly coupled to the base, and an upper surface of the holder member is fixedly coupled to the cover member.

22. The camera module of claim 2, wherein the outer lateral surface of the bobbin is spaced from the inner lateral surface of the holder member.

* * * * *